April 16, 1968     O. O. OLSON     3,377,904
FASTENER FOR CORNER JOINTS
Filed Aug. 22, 1966
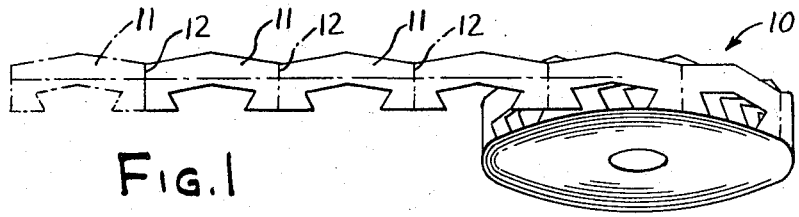
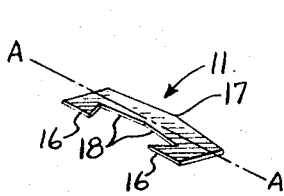
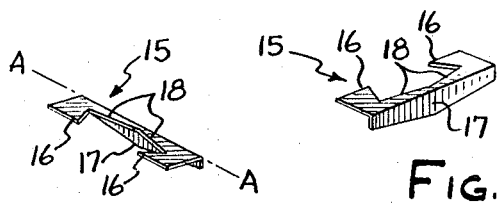
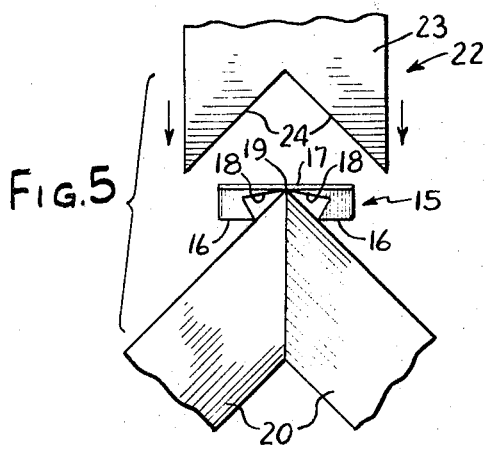
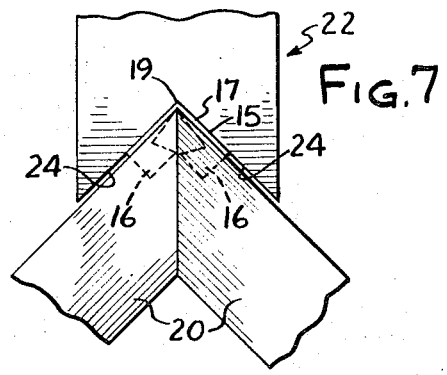
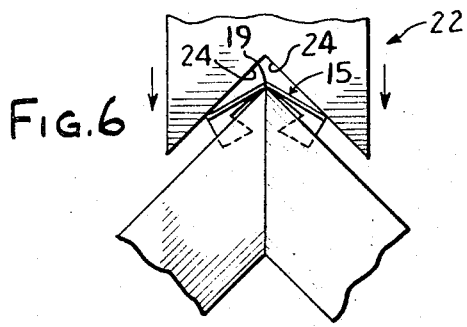
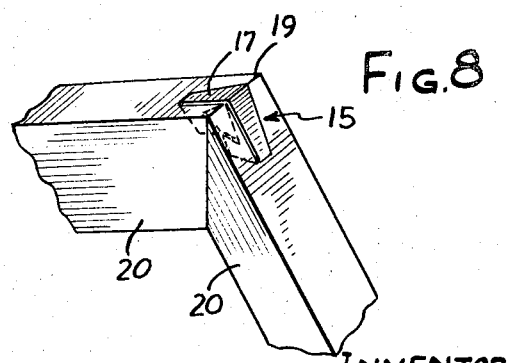
INVENTOR
OSBORNE O. OLSON
by: Wolfe, Hubbard, Voit & Osann
ATTYS.

United States Patent Office 3,377,904
Patented Apr. 16, 1968

3,377,904
FASTENER FOR CORNER JOINTS
Osborne O. Olson, 45 S. Wisconsin Ave.,
Addison, Ill. 60101
Filed Aug. 22, 1966, Ser. No. 573,976
3 Claims. (Cl. 85—11)

ABSTRACT OF THE DISCLOSURE

A one-piece fastener for joining corner members is described in which a broad planar body is furnished with down-turned barbed flanges at each end which dig into and firmly secure the corner members during joining.

---

The present invention relates generally to fasteners, and more particularly to fasteners intended for clinching abutting corner members together into a corner joint. Still more particularly, the invention relates to the assembly of corner members of wood, such as wooden frames and boxes.

In the construction of frames, boxes, tubes and other articles, there has long been a need for a corner fastener which is simply and easily installed, yet which rigidly binds the corner members together into a strong unit. Previous devices have, for example, utilized a length of wire or strip of sheet metal having an inturned hook at each end which could be placed against the sides of the corner members and driven into position. The fastener would bend at its mid-point against the corner edge, and the hook ends would be driven into and buried within the corner members. The fact that the hooked ends were inturned at an acute angle gave them a barbed effect which would prevent the corner joint from loosening so long as the barbs remained buried.

However, it has been an undesirable feature of such fasteners that they must be constructed of relatively thick wire or sheet metal in order to provide sufficient strength to resist warping and distortion of the corner joint, not to mention the stresses involved in driving the fastener into position. If the body of the fastener were made sufficiently strong, the fastener would be too stiff to bend easily at its mid-point around the corner edge, risking mutilation and damage of the corner edge from the driving forces required for proper installation. A compromise had to be struck between a fastener which was sufficiently bendable to be installed without crushing or mutilating the corner edge, yet strong enough to resist twisting and distortion of the joint when installed.

In view of the foregoing, it is an object of the present invention to provide an improved fastener for corner joints which rigidly binds the joint together, while being easily installed without damage to the corner members or the corner edge itself. It is contemplated that the fastener of the present invention will incorporate members having an L-shaped cross-section in combination with barbed ends for secure fastening, while being easily bendable for driving into a corner joint during installation.

Another object is to provide a corner joint fastener of the above description which may be formed of cheap, easily obtained sheet or strip material with little waste.

Still another object is to provide a corner joint construction embodying the fastener as herein described.

Other objects and advantages of the invention will become apparent upon reading the following detailed description and upon reference to the drawings, in which:

FIGURE 1 is a perspective of a partially unrolled blanking ribbon adapted for use in forming the fastener of the present invention;

FIG. 2 is a perspective of an individual fastener blank;

FIG. 3 is a perspective of a fastener struck from the blank of FIG. 2;

FIG. 4 is a perspective rotated 90° from the view of FIG. 3;

FIG. 5 is a plan view of the fastener of the present invention about to be clinched into position by a tool constructed according to a further aspect of the invention;

FIG. 6 is a view similar to FIG. 5, in which the fastener is partially driven home into the corner members;

FIG. 7 is a view similar to FIG. 5 in which the fastener has been fully driven home into the corner members; and FIG. 8 is a perspective of a finished corner joint constructed according to the present invention.

While the invention will be described in connection with a preferred construction, it will be understood that I do not intend to limit the invention to that construction but intend to cover all alternative or equivalent constructions or embodiments as may be included within the spirit and scope of the invention as defined by the appended claims.

Turning to the drawings, there is shown in FIGURE 1 a roll 10 of blanking ribbon consisting of individual fastener blanks joined end-to-end in a continuous strip which may be formed into a roll for convenience in storage or use. Each individual fastener blank 11, whether or not joined in a continuous roll 10, is preferably struck from inexpensive, easily-obtained sheet metal. The blanks may be struck either individually, as illustrated in FIG. 2, or struck end-to-end in rolls as shown in FIGURE 1, with indentations or grooves 12 scored between each blank 11 to allow the blanks to be easily snapped from the roll 10 when needed.

The blank 11 is formed into a fastener 15 by folding the blank 90° along a lengthwise axis A—A as shown in FIGS. 2 and 3. The blank 11, as originally struck, has protrusions 16 at each end and a relatively wide body portion 17 at the center. Opposite the body portion 17 are tapered sections 18, which serve as stiffening flanges when the folding operation has been completed. As shown in FIGS. 3 and 4, the folding process results in a fastener 15 in which the protrusions 16 define barbs angled inward at an acute angle relative to the body 17. The tapered sections 18 become flanges tapering from a relatively thick portion at the extremity of the fastener 15 near the barbs 16 to a negligible width at the center.

When the fastener is placed in position preparatory to installation as shown in FIG. 5, the center portion where the tapered flanges 18 diminish the negligible width is directly at the point contacted by the edge 19 of the corner to be joined. In the illustrated embodiment, the two corner members 20 are beveled at 45° and abut to form a 90° corner, such as might be employed in a picture frame or similar article. The barbs 16 are positioned where they may be driven into the material of the corner members 20, and the tapered flanges 18 are disposed adjacent the edge 19 of the corner itself.

Pursuant to the invention, it may be seen that the stiffening effect of the flanges 18 is distributed across the sides of the fastener 15 adjacent the bending axis along the corner edge, but is substantially absent at the corner edge 19 itself. As will be seen, this contributes significantly to ease of installation and the avoidance of crushing or other damages to the corner edge itself. When installed, the stiffening flanges 18 are also buried in the material of the corner members 20, as is shown in FIG. 7. In this way they serve not only to provide considerable stiffness to the extremities of the fastener 15, but by being driven into the corner members 20 they lock the fastener 15 from shifting sideways along the axis of the corner edge.

For accomplishing installation of the fastener 15, a tool 22 is provided consisting of a head 23 having a pair of faces 24 disposed at an angle substantially congruent with that of the corner to be joined. In the illustrated case, the angle is 90°, coinciding with the angle made by the abutting corner members 20. As the tool 22 is driven against the fastener 15, the barbs 16 are plunged into the corner members 20 in a rotating fashion about an axis defined by the corner edge 19. Because the barbs 16 are cut at an acute angle to the body member 17, they may not be easily withdrawn except with a similar rotating motion which cannot be provided without a tool adapted for this purpose. The tension or compression forces generally encountered which tend to separate the corner members 20 will only serve to drive the barbs 16 deeper rather than loosening them.

When the tool 22 is withdrawn, the resulting joint is smoothly finished, with no protruding edges save the relatively shallow thickness of the body member 17. The stiffening flanges 18 and the barbs 16 are completely buried within the corner members 20, hidden from view while performing their functions of stiffening and clinching the finished joint.

Pursuant to a further aspect of the invention, the proportions of the body portion 17 and the tapered flanges 18 are chosen so as to assure adequate strength to the more highly stressed areas of the fastener while providing the finished joint with a pleasing, stylish appearance. This end is achieved by tapering the body portion 17 toward its extremities in a manner complementary to the taper of the flanges 18. As seen in FIG. 1, the resultant fastener blank 11 comprising the adjoining body portions 17 and flange portions 18 has substantially parallel edges caused by the complementary tapering of its adjoining elements. Expressed in another way, the combined cross-section of the adjoining sheet metal element taken along their common intersection A—A is substantially constant.

The result of this construction is to provide a fastener having greater breadth at the bending axis 19 for strength in the region where the corner members 20 are most apt to pull apart, while tapering somewhat toward its extremities to present a slim, attractive appearance which effects a saving of metal as well as being decorative. At the same time, the deepest portion of the buried flanges 18 lie at the extremities of the fastener where they terminate in the barbs 16. This provides additional strength for the barbs 16 as well as adding considerable extra stiffness to the ends of the fastener to resist deformation during driving and to prevent twisting of the corner members 20 about the completed joint.

I claim as my invention:

1. A one-piece fastener for corner joints having a relatively broad planar body, a bending axis defining the axis of symmetry of said body corresponding to the edge of the joint to be joined, a down-turned planar flange adjoining said body at substantially right angles thereto on each side of said bending axis, the outer portion of each flange terminating at its end in a barb turned inwardly in opposed relationship to the barb on the other flange and extending at an acute angle to said body, said flanges tapering from the barbs to substantially negligible depth at said bending axis, and said body, flanges and barbs being fabricated from a uniform thickness of sheet metal.

2. A fastener according to claim 1 in which the combined cross-sections of said body and said flange is substantially constant along the intersection therebetween.

3. A corner joint comprising a pair of abutting corner members clinched by a fastener constructed according to claim 1, the body of said fastener being folded at said bending axis about the edge of said joint, and said barbs being plunged into said corner members.

References Cited
UNITED STATES PATENTS

| | | | |
|---|---|---|---|
| 400,792 | 4/1889 | Remus | 85—49 |
| 527,184 | 10/1894 | Richey | 85—49 |
| 772,149 | 10/1904 | Hunt | 85—49 |
| 828,960 | 8/1906 | Olson | 287—20.92 |
| 1,793,816 | 2/1931 | Miller et al. | 85—49 |
| 2,082,577 | 6/1937 | Herschmann | 85—17 |

CARL W. TOMLIN, *Primary Examiner.*

RAMON S. BRITTS, *Assistant Examiner.*